Figure 1:
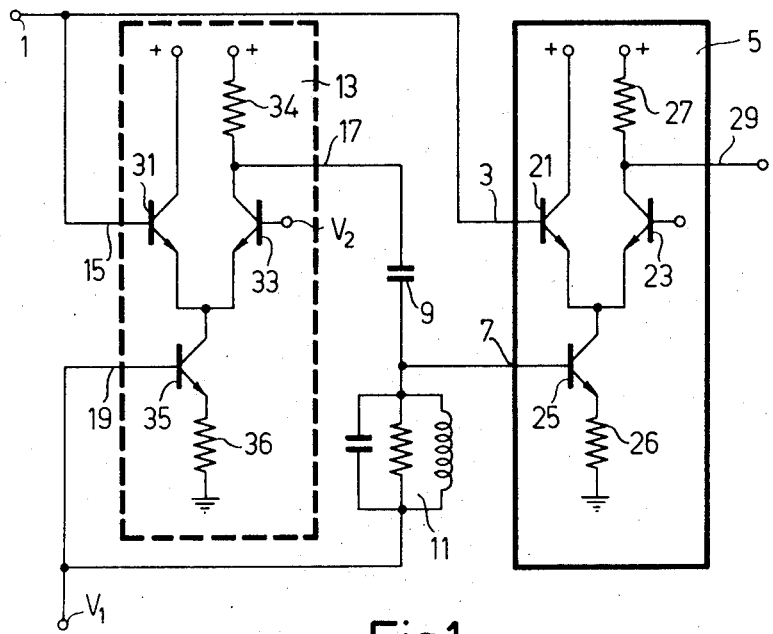

United States Patent
Janssen et al.

[15] 3,702,442
[45] Nov. 7, 1972

[54] DETECTION CIRCUIT FOR FREQUENCY-MODULATED SIGNALS

[72] Inventors: Peter Johannes Hubertus Janssen; Kian Kie Ong, both of Emmasingel, Eindhoven, Netherlands

[73] Assignee: U.S. Philips Corporation, New York, N.Y.

[22] Filed: Feb. 19, 1971

[21] Appl. No.: 116,923

[30] Foreign Application Priority Data

March 7, 1970 Netherlands..............7003280

[52] U.S. Cl. ..................329/103, 307/233, 307/241, 329/110, 329/131
[51] Int. Cl...............................................H03d 3/00
[58] Field of Search........329/103, 110, 50, 131-134; 307/233, 241, 242, 243, 244; 325/347

[56] References Cited

UNITED STATES PATENTS

| | | | |
|---|---|---|---|
| 3,044,020 | 7/1962 | Russell | 329/103 |
| 3,241,078 | 3/1966 | Jones | 329/50 |

*Primary Examiner*—Alfred L. Brody
*Attorney*—Frank R. Trifari

[57] ABSTRACT

Interfering phase modulation of the current passage through an FM- quadrature demodulator as a result of amplitude modulation of the input signal is compensated by using a circuit which converts amplitude modulation of the input signal into phase modulation corresponding to the interfering phase modulation.

6 Claims, 2 Drawing Figures

INVENTORS
PETER J.H. JANSSEN
KIAN K. ONG

BY

AGENT

DETECTION CIRCUIT FOR FREQUENCY-MODULATED SIGNALS

The invention relates to a detection circuit for frequency-modulated signals comprising a gating circuit a first input of which is coupled to an input of the detection circuit and a second input of which is coupled through at least a phase-determining network to the input of the detection circuit.

A detection circuit of the kind described above is known from "Funktechnik" 1969, No. 17, pages 650–651.

An object of the present invention is to enhance the suppression of unwanted output signals as a result of amplitude modulation of signals of small amplitude to be handled by detection circuits of the kind described.

To this end a detection circuit according to the invention of the kind described in the preamble is characterized in that a second gating circuit is included between the input of the detection circuit and the phase-determining network, a first input of said second gating circuit being coupled to the input of the detection circuit, a second input being coupled to a reference potential and an output being coupled to the phase-determining network, the parts of the first and the second gating circuit between their first input and their output having substantially corresponding signal transmission properties.

The Applicant has found that the major cause of the too poor AM- suppression of the know circuit is due to the fact that for an amplitude modulation of the signal to be detected the period of passage of current per period of this signal between the first input and the output of the gating circuit is shifted dependent on the amplitude relative to a reference instant occurring per period and assumed in the signal at the second input.

The invention is based on the recognition of the fact that the detrimental results of this phenomenon can be compensated when the signal at the second input exhibits a similar shift, which is achieved by the step according to the invention.

Figure 2:
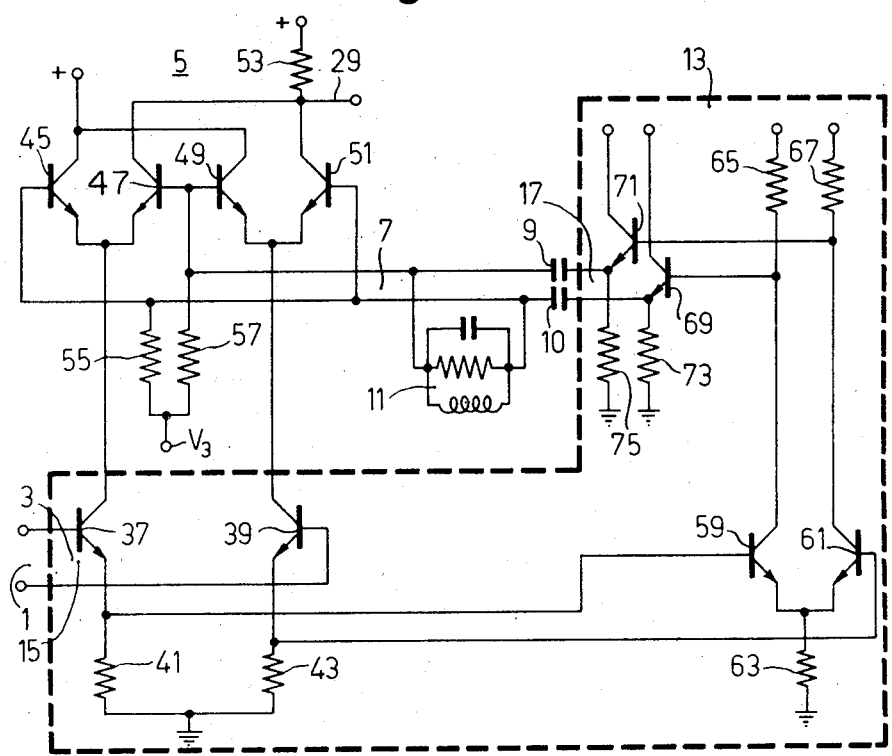

In order that the invention may be readily carried into effect, an embodiment thereof will now be described in detail, by way of example, with reference to the accompanying diagrammatic drawing, in which:

FIG. 1 shows by way of a non-detailed diagram the principle of an FM detection circuit according to the invention, FIG. 2 shows by way of a non-detailed diagram an embodiment of an FM detection circuit according to the invention, in which a part of the actual detector gating circuit is used as the part for the second gating circuit.

In FIG. 1 an input 1 is connected to a first input 3 of a gating circuit 5. The gating circuit 5 has a second input 7 which is connected to the junction of a series arrangement of a capacitor 9 and a parallel circuit 11. This series arrangement constitutes a phase-determining network.

According to the invention a second gating circuit 13 is connected between the other end of capacitor 9 and input 1, a first input 15 of the second gating circuit being connected to the input 1 and an output 17 being connected to the last-mentioned end of capacitor 9. A second input 19 of the second gating circuit 13 is connected to a reference potential $V_1$ to which also the other end of the parallel circuit 11 is connected.

The input 3 of the gating circuit 5 is connected to the base of an npn-transistor 21 the emitter of which is connected to the emitter of an npn-transistor 23 and to the collector of an npn-transistor 25. The collector of transistor 21 is connected to a positive supply voltage to which furthermore the collector of the transistor 23 is connected through a resistor 27. The collector of transistor 23 is also connected to an output 29 of the circuit while its base is connected to a bias voltage $V_2$. The base of transistor 25 is connected to the second input 7 of the gating circuit 5 and the emitter is connected to earth through a resistor 26.

The first input 15 of the second gating circuit 13 is connected to the base of an npn-transistor 31 the collector of which is connected to a positive supply voltage and the emitter of which is connected to the emitter of the npn-transistor 33 and the collector of an npn-transistor 35. The collector of transistor 33 is connected to the output 17 of the second gating circuit 13 and is furthermore connected to a positive supply voltage through a resistor 34. The base of transistor 33 is connected to the bias voltage $V_2$. The emitter of transistor 35 is connected to earth through a resistor 36, and the base is connected to the second input 19 of the second gating circuit 13.

The operation of the circuit is as follows. The first gating circuit 5 together with the phase-determining network 9, 11 serves as the actual FM-detector. A frequency-modulated signal to be detected is directly applied to the first input 3 and to the second input 7 through the second gating circuit 13 and the phase-determining network 9, 11. As a result of the phase-determining network 9, 11, the frequency-modulated signal at this second input 7 is phase-modulated relative to the signal at the first input 3. At the central frequency of the frequency-modulated signal the mutual phase shift is 90° and at a frequency in its vicinity and deviating from the central frequency the deviation relative to the phase shift of 90° is substantially proportional to the deviation of the frequency relative to the central frequency. The phase-determining network 9, 11 furthermore exhibits a filter action so that the output voltage at the second input 7 of the gating circuit 5 is substantially sinusoidal independent of the waveform of the signal applied thereto.

When the signal applied to the input 1 of the detection circuit originates from a limiter circuit, this signal will have substantially always the same amplitude and waveform when the input signal of the limiter circuit has a sufficiently high value. The transistors 23 and 25 of the gating circuit 5 then act, as is known, as a series arrangement of two switches which close and open with a phase difference of 90° one after the other at the central frequency and in case of deviating frequencies close and open at a different frequency-dependent phase difference. A pulsatory direct voltage is then produced across the load resistor 27, the mean value of which voltage is dependent on the phase difference of the signals at the inputs and thus on the frequency modulation of the signal to be detected.

In case of an insufficient limitation of the input signal, the signal at the first input 3 changes in amplitude and/or waveform whereas this is substantially not the case at the second input 7 due to the filter action of the phase-determining network 9, 11. As a result of this variation of the signal at the first input 3, the instant of opening and closing of the transistor 23 also changes, that is to say the periodically occurring period of current passage of the transistor 23 shifts in phase dependent on the amplitude and/or waveform of the input signal. If the second gating circuit 13 were not present, the period of current passage of transistor 25 would not shift in phase and the current passage phase caused by an amplitude modulation of the input signal would thus be detected by the gating circuit.

However, the input signal of the phase-determining network 9, 11 would as such be shifted in phase by the second gating circuit 13 dependent on the amplitude modulation as would the passage of current of transistor 23. To this end the second gating circuit 13 has the same properties of signal transmission from its first input 15 to its output 17 as the corresponding portion of the first gating circuit 5. In this Example this is achieved by an equal structure of the two gating circuits. The signals at the inputs 3 and 7 of the first gating circuit 5 then exhibit a phase modulation due to an amplitude modulation of the input signal of the detection circuit such that this phase modulation compensates the phase modulation of the current passage in the first gating circuit 5 which phase modulation is brought about by the same cause.

It will be evident that the structure of the gating circuits 5 and 13 may alternatively be chosen to be different, provided that the above-mentioned compensation is obtained. Thus, for example, the gating circuit 5 may be formed as a double acting quadrature demodulation circuit having two parallel-arranged transistor pairs controlled in phase opposition. Alternatively, other types of gating circuits may be used optionally instead of the described first and/or second gating circuit.

In FIG. 2, in which corresponding parts have the same reference numerals as those in FIG. 1, the input 1 of the detection circuit is formed in a balanced manner and is connected to the bases of two npn-transistors 37 and 39. The emitters of transistors 37 and 39 are connected to earth through resistors 41 and 43, respectively. The collector of transistor 37 is connected to the emitters of two npn-transistors 45 and 47 while the collector of transistor 39 is connected to the emitters of two npn-transistors 49 and 51.

The collectors of transistors 45 and 49 are connected to a positive supply voltage. The collectors of transistors 47 and 51 are interconnected and are connected to a positive supply voltage through a load resistor 53 and are furthermore connected to the output 29 of the detection circuit.

The bases of the transistors 45 and 51 are connected together and through a resistor 55 to a bias voltage $V_3$. The bases of transistors 47 and 49 are interconnected and are connected through a resistor 57 to the bias voltage $V_3$ The above-described circuit constitutes the first gating circuit 5 including the first input 3 corresponding to the input 1 and the second input 7 which is formed in a balanced manner and which is connected to the bases of transistors 45, 51 and 47, 49, respectively.

The second input 7 of the first gating circuit 5 is connected to the ends of the parallel circuit 11. The outputs of the parallel circuit 11 are connected through two capacitors 9 and 10 to the balanced output 17 of the second gating circuit 13.

The second gating circuit 13 coincides partially with the first gating circuit 5 and has the same first input 3, 15, while furthermore the emitter circuits of transistors 37 and 39 form part thereof. The earth connection to the resistors 41 and 43 is to be considered the second input having a reference potential. The emitters of transistors 37, 39 are connected to the bases of two npn-transistors 59 and 61, respectively. The emitters of transistors 59, 61 are interconnected and are connected to earth through a resistor 63. The collectors of transistors 59, 61 are connected through resistors 65 and 67 to a positive supply voltage and are furthermore connected to the bases of two npn-transistors 69 and 71, respectively. These transistors 69 and 71 are arranged as emitter followers. Their collectors are connected to a positive supply voltage and their emitters are connected to earth through resistors 73 and 75. These emitters are furthermore connected to the balanced output 17 of the second gating circuit 13.

The known action of the first gating circuit 5 serving as the actual FM detector is such that a phase shift occurring between the signals at the inputs 3 and 7 is converted into a voltage having a variable pulse width across the load resistor 53 whose mean value is proportional to this phase shift. The transistors 37 and 39 act as switches which relative to each other are operated in phase opposition by the signal at the first input and the transistors 45, 47, 49 and 51 act as switches arranged in series therewith which are operated pairwise relative to each other in phase opposition by the signal at the second input 7.

The signals at the inputs 3 and 7 exhibit a frequency-dependent phase shift due to the action of the phase-determining network 9, 10, 11 so that also the mean value of the voltage across the resistor 53 is dependent on the frequency of these signals.

When as a result of an amplitude modulation, the waveform and/or the amplitude of the signal at the input 3 varies, the periodical period of current passage of transistors 37 and 39 is shifted in phase. However, the current passage through transistors 37 and 39 causes a voltage across emitter resistors 41, 43 of the transistors 37 and 39 in which voltage this phase shift is also present. This voltage is amplified by the transistor pair 59, 61 and transferred through the emitter followers 69 and 71 to the output 17 of the second gating circuit 13.

The phase-determining network 9, 10, 11 is thus controlled by a voltage which is a true copy of the current passage of transistors 37 and 39 and which exhibits the same modulation-dependent phase shift in case of amplitude modulation. As a result the voltage at the second input 7 of the first gating circuit will also exhibit this phase shift and there will be no effect noticeable in the signal at the output 29.

What is claimed is:

1. A circuit for detecting a frequency modulated signal comprising a first gate having a first input coupled to receive said signal, a second input, and an output means; a network for producing a phase shift that is a function of the frequency of said signal coupled to said second input; and means coupled to said network and to receive said signal for producing a phase shift that is a function of variations in the amplitude of said input signal; whereby said output means provides a demodulated signal from said original signal with a reduced effect by said amplitude variations.

2. A circuit as claimed in claim 1 wherein said first gate output signal has a particular variation as a function of said amplitude variations and said producing means has said same variation; whereby the effects of said amplitude variations are eliminated.

3. A circuit as claimed in claim 2 wherein said producing means comprises a second gate having first and second inputs.

4. A circuit as claimed in claim 3 wherein said first and second gates are identical.

5. A circuit as claimed in claim 4 wherein each of said gates comprises a pair of emitter coupled transistors and a current source transistor coupled to said emitters, one of said pair being coupled to said first input respectively, said current source transistor being coupled to said second input respectively.

6. A circuit as claimed in claim 3 wherein said gates have a common emitter coupled transistor pair.

* * * * *